Patented Nov. 21, 1933

1,936,562

UNITED STATES PATENT OFFICE 1,936,562

ACCELERATOR FOR THE VULCANIZATION OF RUBBER

Frederick Lewis Kilbourne, Jr., Cuyahoga Falls, Ohio, assignor to The Firestone Tire & Rubber Company, Akron, Ohio, a corporation of Ohio No Drawing. Application January 19, 1931
Serial No. 509,889

17 Claims. (Cl. 18—53)

This invention relates to the art of producing vulcanized rubber, and more especially it relates to the production of such a product by the use of novel compositions for accelerating the vulcanization process.

A large number of nitrogen and nitrogen-sulfur containing compounds for accelerating vulcanization of rubber are known and commercially employed, among which di-ortho-tolyl-guanidine and 2-mercapto-benzo-thiazole are cited as examples. These compounds when added to the rubber mix before vulcanization improve the properties of the product and shorten the time required to effect vulcanization.

The use of a number of the above-mentioned compounds has a distinct disadvantage in that the accelerating power of the nitrogen and nitrogen-sulfur compound becomes effective during the compounding or processing of the raw rubber so that the latter is "set up" or partly vulcanized in the mill, calender, or tubing machine, or other apparatus in which the material is being handled. Accordingly, in the present invention I avoid the disadvantages mentioned by the use of a suitable retarder of vulcanization, namely, phthalic anhydride. The use of this material in the rubber compound eliminates "set up" or partial vulcanization during the interval of treatment and at the temperature encountered, in the mill, calender or tubing machine, but permits vulcanization of the rubber when the temperature is raised to the proper curing heat for the proper duration of cure.

Phthalic anhydride in its crystalline form, even when very finely ground, has the property of agglomerating, and thus when mixed with rubber, does not become thoroughly and uniformly dispersed therein. This is especially objectionable when the stock in which it is used is vulcanized only for a short time, since the locally concentrated phthalic anhydride causes a "spotty" cure with small areas undercured.

In order to avoid the aforesaid disadvantages inherent in the use of crystalline phthalic anhydride, I form a mixture of the three ingredients, namely, di-ortho-tolyl-guanidine, 2-mercapto-benzo-thiazole, and phthalic anhydride, by dissolving them in a suitable solvent to form a homogeneous mixture, and then driving off the solvent. Preferably the solvent is acetone, and it is evaporated from the mixture under atmospheric or sub-atmospheric pressure at a temperature not exceeding 110° C.

The resulting product is a clear, reddish brown resin of which the respective ingredients have suffered little or no decomposition. It has a softening point of 72° C. and can be pulverized at lower temperatures. Illustrative examples of compositions found to be suitable accelerators for the vulcanization of rubber are composed of approximately the following ingredients:

|  | Mole percent | | |
|---|---|---|---|
|  | I | II | III |
| Di-ortho-tolyl-guanidine | 33 | 40 | 44 |
| 2-mercapto-benzo-thiazole | 33 | 40 | 44 |
| Phthalic anhydride | 33 | 20 | 12 |

The delayed action of the accelerator is less pronounced as the proportion of phthalic anhydride is reduced. An advantage of the new blended accelerator is that its composition may be varied somewhat to suit the needs and requirements of the rubber stock in which it is to be used. It provides safe, cheap acceleration with no factory handling difficulties from scorched stocks or undispersed curing ingredients.

Another and important advantage of my improved form of accelerator is that it melts at the relatively low temperature of 72° C. and thus it will flux and become thoroughly admixed with the rubber when worked on a mill or calender, the temperature of rubber in such mill or calender averaging 80° C. with the maximum of 100° C. This advantage of applicant's new product is more apparent when one considers the melting points of its respective ingredients in their normal form, viz:

Di-ortho-tolyl-guanidine _____ 168° C.
2-mercapto-benzo-thiazole _____ 176° C.
Phthalic anhydride_____ 130° C.

An example of the effect produced by employing the improved blended accelerator in a rubber mix is shown by the following data. Comparison is made between two rubber mixes containing the following constituents:

| Ingredients | A percent | B percent |
|---|---|---|
| Rubber | 68.0 | 68.0 |
| Sulphur | 2.88 | 2.88 |
| Zinc oxide | 3.0 | 3.0 |
| Pigment | 23.5 | 23.5 |
| Stearic acid | .5 | .5 |
| Oil | 1.81 | 1.69 |
| Di-ortho-tolyl-guanidine | .19 |  |
| 2-mercapto-benzo-thiazole | .12 |  |
| Blended accelerator (Example I) |  | .43 |

The following data were obtained from tests:
Test I.—Set up in 15 minutes in the Williams plastometer at 212° F. according to the method disclosed in volume 16 Ind. Eng. Chem. 922–4 (1924).

Per cent
A _____ 27.3
B _____ 0.0

*Test II*

Cured 10 minutes at 260° F.

|   | Modulus at 600% elongation | Tensile at break |
|---|---|---|
| A | 550 | 1680 |
| B | 220 | 590 |

*Test III*

Cured at 307° F.

| Time in minutes | Modulus at 600% elongation | | | | Tensile at break | | | |
|---|---|---|---|---|---|---|---|---|
|  | 4 | 6 | 8 | 10 | 4 | 6 | 8 | 10 |
| A | 800 | 1220 | 1650 | 1900 | 1975 | 3140 | 3315 | 3390 |
| B | 590 | 1300 | 1600 | 1690 | 1840 | 3260 | 3465 | 3420 |

The foregoing tests show clearly the desirable results obtained by the use of the improved accelerator. The results show not only the retarding effect of the new accelerator used in stock "B", both at reduced and at normal vulcanizing temperatures, but also show that the physical characteristics of the finished products are substantially alike.

It will be further understood that the invention is not limited to the specific accelerators set forth, and that equivalent compounds may be used to obtain products in accordance with this invention. Thus in place of di-ortho-tolyl-guanidine, I may use other guanidines, such as tri-phenyl-guanidine, tolyl-phenyl-guanidine, or di-phenyl-guanidine, and in place of 2-mercapto-benzo-thiazole I may use, for example, mercapto-tolyl-thiazole, mercapto-xylyl-thiazole, or mercapto-naphthyl-thiazole to produce equally desirable accelerators.

Other modifications may be resorted to without departing from the spirit of the invention or the scope of the appended claims.

Another modification within the scope of the present invention is the substitution of other retardants for phthalic anhydride where such retardants will form resins with the guanidine and mercapto-thiazole ingredients. Other suitable retardants found to meet these requirements are maleic anhydride, benzoic acid, salicylic acid, and p-toluene sulphonyl chloride. Each of these compounds will retard vulcanization to prevent premature "set up" and will form resins with guanidines and mercapto-thiazoles, such resins being fusible in the rubber batch during the compounding of the same.

What is claimed is:

1. A composition comprising di-ortho-tolyl-guanidine, 2-mercapto-thiazole, and phthalic anhydride fused together in a homogeneous mass.

2. The process of producing a rubber vulcanization accelerator which comprises dissolving an accelerator and a retardant and then driving off the solvent.

3. The process of producing a rubber vulcanization acclerator which comprises dissolving an accelerator and a retardant in acetone, and thereafter removing the acetone.

4. The process of producing a rubber vulcanization accelerator which comprises dissolving an accelerator and phthalic anhydride in acetone, and thereafter removing the acetone.

5. The process of producing a rubber vulcanization accelerator which comprises dissolving di-ortho-tolyl-guanidine, 2-mercapto-benzo-thiazole, and phthalic anhydride in acetone, and thereafter removing the acetone.

6. The process of producing a rubber vulcanization accelerator which comprises forming a mixture of di-ortho-tolyl-guanidine, 2-mercapto-benzo-thiazole, phthalic anhydride, and acetone, and then heating the mixture to drive off the acetone.

7. A process of manufacturing vulcanized rubber which comprises heating a mixture of rubber and sulfur in the presence of an accelerator consisting of a fused mass comprising di-ortho-tolyl-guanidine, 2-mercapto-benzo-thiazole, and phthalic anhydride.

8. A process as defined in claim 7 in which the ingredients are fused by being dissolved in acetone before being mixed with the rubber.

9. A process as defined in claim 7 in which the ingredients of the accelerator are dispersed in the rubber mixture by fluxing.

10. The process of effecting the curing of rubber which consists in dissolving di-ortho-tolyl-guanidine, 2-mercapto-benzo-thiazole and phthalic anhydride, driving off the solvent to produce a fused blended homogeneous mass, incorporating the latter in a rubber mix, and vulcanizing the mix.

11. The vulcanized rubber product formed by heating a mixture of rubber and sulfur in the presence of a vulcanization accelerating composition comprising di-ortho-tolyl-guanidine, 2-mercapto-benzo-thiazole, and phathalic anhydride in a fused mass.

12. A composition comprising a guanidine, 2-mercapto-thiazole, and phthalic anhydride fused together in a homogeneous mass.

13. The process of producing a rubber vulcanization accelerator which comprises dissolving a guanidine, a mercapto-thiazole, and phthalic anhydride in acetone, and thereafter removing the acetone.

14. The process of effecting the curing of rubber which consists in dissolving a guanidine, a mercapto-thiazole and phthalic anhydride, driving off the solvent to produce a fused blended homogeneous mass, incorporating the latter in a rubber mix, and vulcanizing the mix.

15. The vulcanized rubber product formed by heating a mixture of rubber and sulfur in the presence of a vulcanization accelerating composition consisting of a fused mass comprising a guanidine, a mercapto-thiazole, and phthalic anhydride.

16. The process of producing a rubber vulcanization accelerator which comprises forming a mixture of a guanidine, a mercapto-thiazole, phthalic anhydride, and acetone, and then heating the mixture to evaporate the acetone.

17. A process of manufacturing vulcanized rubber which comprises heating a mixture of rubber and sulfur in the presence of an accelerator consisting of a fused mass comprising a guanidine, a mercapto-thiazole, and a vulcanization retardant selected from the following group of compounds, phthalic anhydride, maleic anhydride, benzoic acid, salicyclic acid, and p-toluene sulphonyl chloride.

FREDERICK LEWIS KILBOURNE, Jr.